March 27, 1951 W. J. PROPHETER 2,546,562
HAY LOADING MACHINE
Filed Sept. 10, 1946 2 Sheets-Sheet 1
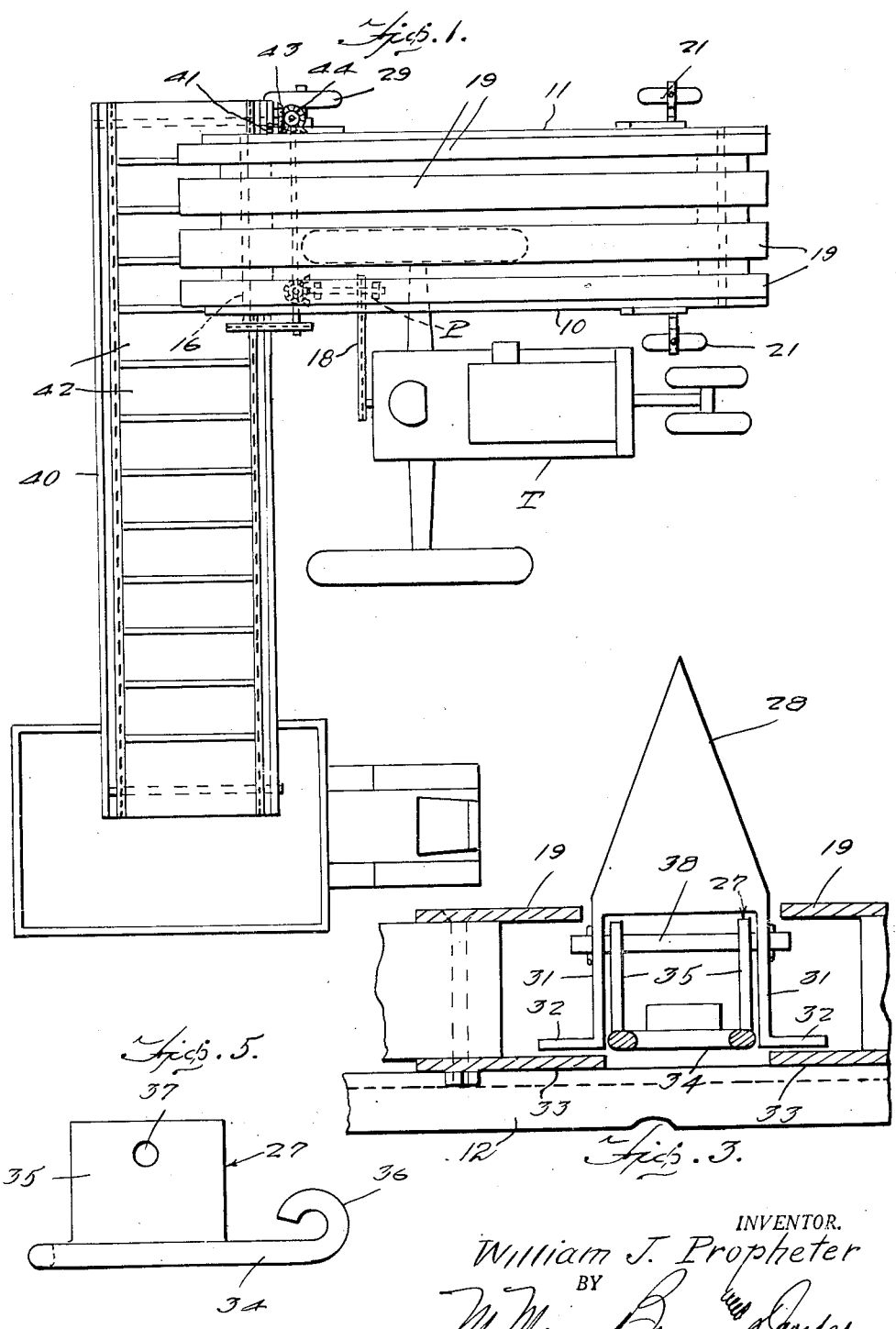
INVENTOR.
William J. Propheter March 27, 1951  W. J. PROPHETER  2,546,562
HAY LOADING MACHINE
Filed Sept. 10, 1946  2 Sheets-Sheet 2
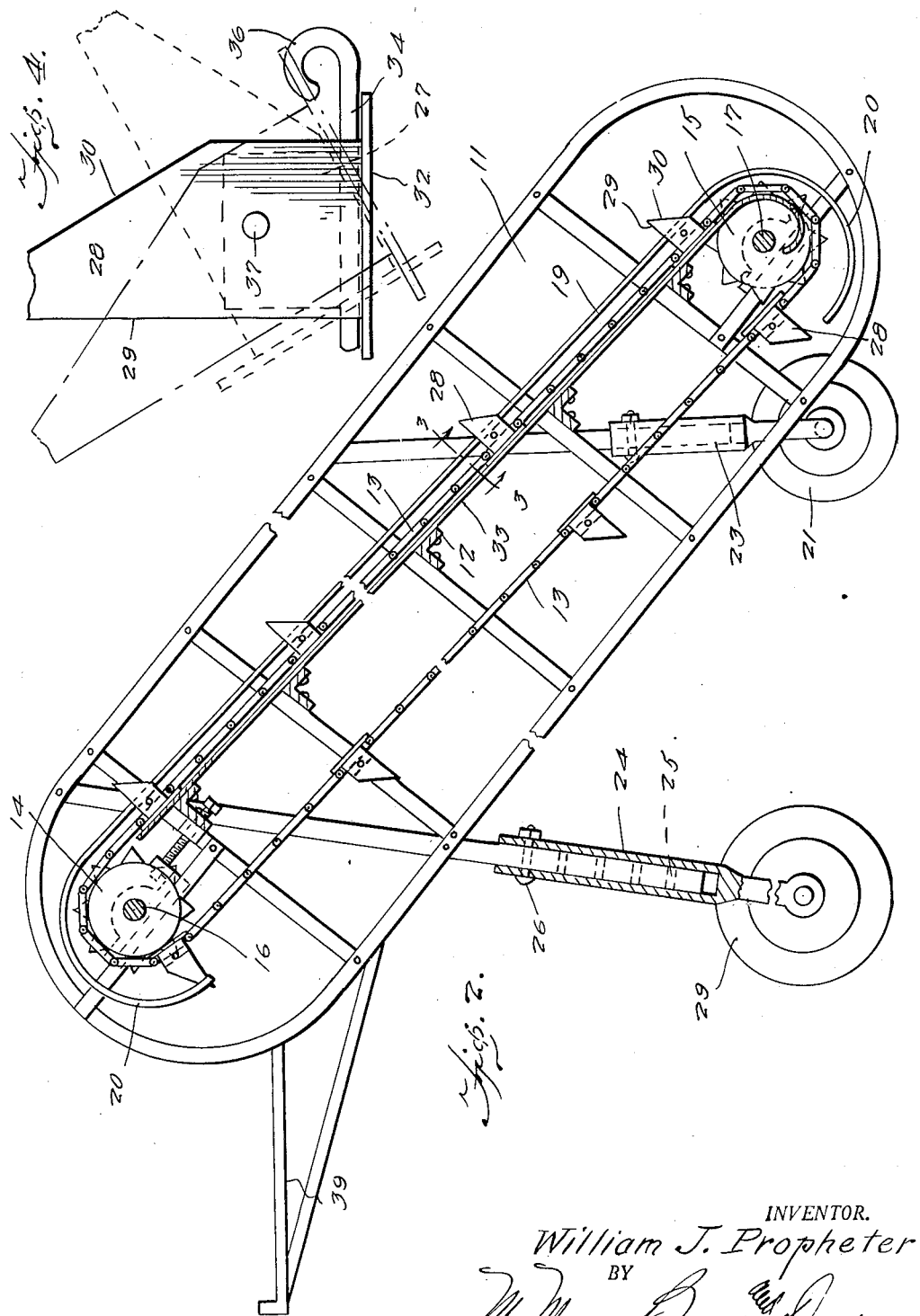
INVENTOR.
William J. Propheter
BY
ATTORNEY.

Patented Mar. 27, 1951

2,546,562

UNITED STATES PATENT OFFICE 2,546,562

HAY LOADING MACHINE

William J. Propheter, Sterling, Ill.

Application September 10, 1946, Serial No. 695,945

2 Claims. (Cl. 198—7)

The present invention relates to loading machines and is more particularly concerned with a hay loader which can be attached to and derive power from a farm tractor.

The primary object of the invention is to provide an apparatus of the character referred to which will pick up hay from the ground, whether in bales, bundles or loose and convey it onto a truck in such manner that it can be evenly distributed therein without pushing it in place as is the common practice in rear end loading.

Another object of the invention is to provide apparatus of the character referred to which can be readily adjusted and attached to farm tractors of various sizes and makes and be operated by power taken from the tractor.

A further object of the invention is to provide a novel pick up device to be used in association with a rotary conveyor belt.

With the foregoing and other objects and advantages in view, the invention consists of the novel construction, arrangement and combination of parts hereinafter described and claimed.

In the accompanying drawings illustrating the invention,

Figure 1 is a diagrammatic view of the hay loading apparatus attached to a farm tractor and in operative position to load hay on a truck.

Figure 2 is a longitudinal section through the lower conveyor.

Figure 3 is an enlarged fragmentary section on line 3—3 of Figure 2.

Figure 4 is an enlarged side elevation of one of the pivotal rake fingers carried by the sprocket chains of the lower conveyor and designed to pick up hay on the ground.

Figure 5 is an enlarged side elevation of the mounting for the pivotal rake fingers.

Like reference characters, as used in the description and drawings, designate the same parts of construction.

Referring to Figure 2, the lower conveyor, which is normally positioned on a slant upward from the ground, is mounted in a main frame having spaced sides 10 and 11 with rounded ends suitably trussed by transverse angle-iron bars 12 positioned in parallel spaced relation with respect to each other inside the circuit of a plurality of sprocket chains 13 carried by sprockets 14 and 15 mounted on upper and lower sprocket shafts 16 and 17, adjacent each end of the frame.

The upper sprocket shaft 16 is driven by an outside sprocket and chain 18 deriving power from a power take-off P on a conventional farm tractor T. Endless sprocket chains 13 are suitably spaced apart and parallel guide panels 19 with under-turned curved ends 20 are provided on each side. These extend from one end of the frame structure to the other.

The frame structure is mounted on swiveled front and rear traction wheels 21 and 29 journaled on the lower ends of telescopic front and rear struts 23 and 24. These struts are made adjustable perpendicularly by means of a plurality of vertically aligned, transverse bolt-holes 25 in the inner member of each strut and a fastening bolt 26 passing through the outer member and secured removably by a nut threaded thereon.

As shown in Figure 2, the rear struts are longer than the front wheel struts and are designed to maintain the frame structure on an incline with its front end close to the ground.

The tractor T is positioned alongside the frame structure with its rear wheel on the near side well under the structure and intermediate the front and rear struts thereof, thus aligning the sprocket on the power take-off P with a sprocket on the engine shaft of the tractor T.

Pivotally secured to the several sprocket chains 13 in equi-distant positions are a plurality of upstanding brackets 27 straddling each of said chains and designed to carry the pivoted rake teeth 28. These teeth have a perpendicular front 29 and an inclined rear 30 which are convergent on a sharp tooth point. Extending rearwardly from the pointed end are two parallel sides 31 with outwardly projecting flanges 32, designed to travel on longitudinal supporting strips 33 arranged between and below the portions of said chains constituting the upper runs of said sprocket chains.

The brackets 27, which serve as carriers for the rake teeth, are in the form of a link 34 with outwardly projecting parallel ears 35, positioned on opposing sides of the link, the latter having one upturned link-eye 36 to engage a transverse rod in the sprocket chain.

Bolt holes 37 in the side 31 of the rake teeth and the ears of the brackets 27, positioned to register, contain a transverse pivot bolt 38 with cotter pins to secure same in place. The said teeth are designed to clear the ground, at the lowest point of the run of the sprocket chains, a suitable distance above to pick up the hay in front thereof, whether it be in bales, bundles or loose shape.

Mounted on stationary supports 39 projecting outwardly from the underside of the upper end of the frame structure of the lower conveyor is the frame of an auxiliary conveyor 40 which is swiveled at 41 to the outer side frame 11 of the lower conveyor.

It comprises oppositely disposed, parallel sides designed to be positioned on an upward incline from the lower conveyor and contain parallel runs of sprocket chains carrying transverse slats 42 and powered by the power take-off P on the tractor, through the medium of suitable bevel gearing 43 and 44 to drive the lower sprocket shaft of said conveyor. This auxiliary conveyor is designed to deliver the hay from the pick-up conveyor to a loading truck which is positioned to receive same over the side, as desired, instead of the usual rear end loading. To facilitate side loading it will be observed that the auxiliary conveyor 40 is positioned at an approximate right angle to the lower or pick-up conveyor.

As different embodiments may be made of this inventive concept and modifications may be made in the embodiment hereinbefore shown and described, it will be understood that the matter herein is to be interpreted as illustrative merely, and not in a limiting sense.

What I claim is:

1. A loading conveyor for attachment to a vehicle comprising a mobile frame inclined at an angle with respect to a ground surface, a plurality of horizontally disposed endless chains arranged longitudinally of and within said frame in side by side spaced relation with respect to each other and at substantially the same inclined angle with respect to said ground surface as said frame and mounted in said frame for rotation about horizontal axes, a horizontally disposed supporting strip extending longitudinally of said frame arranged between adjacent portions of said chains constituting the upper runs thereof and below and spaced from said upper runs, a plurality of spaced upstanding rake teeth arranged transversely of and straddling each of said chains and each mounted on said chain for rocking movement about an axis transverse of said chain, means on each of said rake teeth and engageable with the adjacent portion of said supporting strip while the portions of said chains constitute the upper runs thereof for maintaining said rake teeth in their upstanding position, and a horizontally disposed guide panel extending longitudinally of said frame arranged between the portions of said chains constituting the upper runs thereof and above and spaced from said upper runs.

2. A loading conveyor for attachment to a vehicle comprising a mobile frame inclined at an angle with respect to a ground surface, a plurality of horizontally disposed endless chains arranged longitudinally of and within said frame in side by side spaced relation with respect to each other and at substantially the same inclined angle with respect to said ground surface as said frame and mounted in said frame for rotation about horizontal axes, a horizontally disposed supporting strip extending longitudinally of said frame arranged between adjacent portions of said chains constituting the upper runs thereof and below and spaced from said upper runs, a plurality of spaced upstanding brackets arranged transversely of and straddling each of said chains and secured to said chains, a rake tooth superimposed upon each of said brackets and connected to the adjacent bracket for rocking movement about an axis transverse of said chain, means on each of said rake teeth and engageable with the adjacent portion of said supporting strip while the portions of said chains constitute the upper runs thereof for maintaining said rake teeth in their upstanding position, and a horizontally disposed guide panel extending longitudinally of said frame arranged between the portions of said chains constituting the upper runs thereof and above and spaced from said upper runs.

WILLIAM J. PROPHETER.

REFERENCES CITED

The following references are of record in the file of this patent:

UNITED STATES PATENTS

| Number | Name | Date |
| --- | --- | --- |
| 169,936 | Whitney | Nov. 16, 1875 |
| 255,510 | Hooton | Mar. 28, 1882 |
| 645,851 | Herbert | Mar. 20, 1900 |
| 1,936,603 | Larson | Nov. 28, 1933 |
| 2,055,677 | Tallman et al. | Sept. 29, 1936 |
| 2,141,493 | Tallman | Dec. 27, 1938 |
| 2,172,655 | Gallagher et al. | Sept. 12, 1939 |
| 2,187,026 | Hamachek | Jan. 16, 1940 |
| 2,242,077 | Jones | May 13, 1941 |
| 2,320,667 | Smith | June 1, 1943 |
| 2,327,494 | Brown | Aug. 24, 1943 |